United States Patent
Baldoni et al.

(10) Patent No.: US 6,663,682 B2
(45) Date of Patent: Dec. 16, 2003

(54) ARTICLE OF SUPERABRASIVE COATED WITH METAL

(75) Inventors: J. Gary Baldoni, Norfolk, MA (US); Richard M. Andrews, Long Valley, NJ (US); Earl G. Geary, Jr., Framingham, MA (US); Douglas H. Shaw, Worcester, MA (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 10/328,253

(22) Filed: Dec. 23, 2002

(65) Prior Publication Data

US 2003/0106270 A1 Jun. 12, 2003

Related U.S. Application Data

(60) Division of application No. 09/873,172, filed on Jun. 1, 2001, now Pat. No. 6,524,357, which is a continuation-in-part of application No. 09/609,453, filed on Jun. 30, 2000, now abandoned.

(51) Int. Cl.$^7$ .............................. C09K 3/14; B24D 3/04; B32B 3/00; B32B 9/00; D06N 7/00

(52) U.S. Cl. .............................. 51/307; 51/295; 51/293; 428/403; 428/404; 428/141; 428/144; 428/148

(58) Field of Search .................. 51/307–308, 309, 51/295, 293; 428/141, 144, 148, 403, 404

(56) References Cited

U.S. PATENT DOCUMENTS

| | | | |
|---|---|---|---|
| 2,382,666 A | * 8/1945 | Rohrig et al. ................... 51/307 |
| 3,650,714 A | 3/1972 | Farkas ............................ 51/295 |
| 3,841,852 A | 10/1974 | Wilder et al. .................. 51/295 |
| 3,871,840 A | 3/1975 | Wilder et al. .................. 51/295 |
| 3,929,432 A | 12/1975 | Caveney ........................ 51/295 |
| 3,957,461 A | 5/1976 | Lindstrom et al. ............. 51/295 |
| 3,984,214 A | 10/1976 | Pratt et al. ................... 51/298 R |
| 4,011,064 A | 3/1977 | Lee et al. ....................... 51/295 |
| 4,018,576 A | 4/1977 | Lowder et al. ............. 51/309 R |
| 4,063,907 A | 12/1977 | Lee et al. ....................... 51/295 |
| 4,157,897 A | 6/1979 | Keat .............................. 51/295 |
| 4,239,502 A | 12/1980 | Slack et al. .................... 51/295 |
| 4,246,004 A | 1/1981 | Busch et al. .................... 51/295 |
| 4,378,975 A | 4/1983 | Tomlinson et al. ............ 51/309 |
| 4,399,167 A | 8/1983 | Pipkin .......................... 427/217 |
| 4,435,189 A | 3/1984 | Bovenkerk .................... 51/295 |
| RE31,883 E | 5/1985 | Bovenkerk et al. ........... 51/295 |
| 4,606,738 A | 8/1986 | Hayden ......................... 51/295 |
| 4,943,488 A | 7/1990 | Sung et al. ................... 428/552 |
| 4,968,326 A | 11/1990 | Wiand ........................... 51/293 |
| 5,024,680 A | 6/1991 | Chen et al. .................... 51/295 |
| 5,049,164 A | 9/1991 | Horton et al. ................. 51/295 |
| 5,062,865 A | 11/1991 | Chen et al. ................. 51/298 R |
| 5,085,671 A | 2/1992 | Martin et al. .................. 51/293 |
| 5,096,465 A | 3/1992 | Chen et al. .................... 51/295 |
| 5,126,207 A | 6/1992 | Chen et al. ................... 428/408 |
| 5,151,107 A | 9/1992 | Cho et al. ...................... 51/295 |
| 5,163,975 A | 11/1992 | Martin ........................... 51/293 |
| 5,224,969 A | 7/1993 | Chen et al. .................... 51/295 |
| 5,232,469 A | 8/1993 | McEachron et al. .......... 51/295 |
| 5,250,084 A | 10/1993 | Lansell et al. ................. 51/293 |
| 5,250,086 A | 10/1993 | McEachron et al. .......... 51/309 |
| 5,254,141 A | 10/1993 | Yamazaki et al. ............. 51/295 |
| 5,366,579 A | 11/1994 | Yamazaki et al. ........... 156/247 |
| 5,405,573 A | * 4/1995 | Clark et al. .................... 51/307 |
| 5,491,028 A | 2/1996 | Sarin et al. ................... 428/408 |
| 5,607,489 A | 3/1997 | Li ................................. 51/309 |
| 5,647,878 A | 7/1997 | Iacovangelo et al. ......... 51/295 |
| 5,672,382 A | 9/1997 | Lux ............................. 427/213 |
| 5,755,299 A | 5/1998 | Langford et al. ........... 175/375 |
| 5,855,314 A | 1/1999 | Shiue et al. ............. 228/124.5 |

FOREIGN PATENT DOCUMENTS

| | | | |
|---|---|---|---|
| EP | 0 570 635 A1 | 11/1993 | ............ B24D/3/06 |
| GB | 1310324 | 3/1973 | |
| JP | 62-057871 | 3/1987 | |
| WO | WO 99/36658 | 7/1999 | |

OTHER PUBLICATIONS

Chuprina, V.G., Powder Materials, Parts and Coatings, Physicochemical Interatction and Structure Development During the Formation of Metal Gas–Transfer Coatings on Diamond (Review). I. Kinetics, Poroshkovaya Metallurgiya. No. 7 (355) pp. 34–40 Jul., 1992. Soviet Powder Metallurgey & Metal Ceramics, Plenum Publishing Corp., 1992, Vol 7, No. 355 ,pp. 578–583.

Chuprina, V.G.,Physicochemical Interatction and Structure Development During the Formation of Metal Gas–Transfer Coatings on Diamond (Review). II Mechanism. Poroshkovaya Metallurgiya. No. 8 (356) pp. 57–63 Aug., 1992. Soviet Powder Metallurgey & Metal Ceramics, Plenum Publishing Corp., 1993.

Chuprina, V.G., Polk, G.P., Special Features of Formation of Molybdenum Coatings on Diamond With The Spatial Distribution of Reagents, Soviet Powder Metallurgey & Metal Ceramics, Plenum Publishing Corp., 1988, Vol 27, No. 4,pp. 311–314. Translated from Institute of Problems of Materials Science, Academy of Sciences of the Ukrainian SSR, Kiev. Poroshkovaya Metallurgiya No. 4 (304) pp 62–65 Apr. 1988.

Lavinenko, I.A., Volk, G.P., et al., Investigation Into the Process of the Metallization of Diamond inPowder Mixtures with Refractory Carbide–Forming Metals, Adgeziya Rasplavov i Pailca Materialov, 1977/8, pp. 46–49, (no month).

(List continued on next page.)

Primary Examiner—Michael Marcheschi
(74) Attorney, Agent, or Firm—Jeffrey C. Lew; Mary E. Porter

(57) ABSTRACT

A process for metal coating diamond superabrasive particles involves heating the superabrasive particles in the presence of coat-forming powder of a metal compound under a common inert atmosphere. The metal compound contains a metal which can be thermochemically reduced by the superabrasive substance serving as the reducing agent. The process forms a chemical bond at the interface between the outer metal layer and the superabrasive particle substrate. The metal coated superabrasive particles can be hydrogen treated in situ and separated from excess coat-forming powder easily by filtration. The product particles are ideal for use in a wide variety of metal bonded cutting, machining, dressing and other abrasive tools, especially diamond film insert and single layer diamond tools.

2 Claims, No Drawings

OTHER PUBLICATIONS

Chuprina, V.G., Shalya, I.M., & Shurkhal, V.V., Specific Features of Obtaining Molybdenum–Nickel Coatings On Diamond, Poroshkovaya Metallurgiya. No. 6 (354) pp. 23–38 Jun., 1992. Soviet Powder Metallurgey & Metal Ceramics, Plenum Publishing Corp., 1992.

Grishachev, V.F., Maslov, V.P., Vesna, V.T., Shcerbakova, L..E., Metallization of Diamonds in a Gaeous Atmosphere of Molybdenum Chlorides. Poroshkovaya Metallurgiya. No. 4 (256) pp. 40–44 Apr., 1984. Soviet Powder Metallurgey & Metal Ceramics, Plenum Publishing Corp., 1984, vol. 23,No. 4, pp. 286–290.

* cited by examiner

ARTICLE OF SUPERABRASIVE COATED WITH METAL

This is a divisional application of U.S. patent application Ser. No. 09/873,172, filed Jun. 1, 2001, U.S. Pat. No. 6,524,357 which is a continuation-in-part of U.S. patent application Ser. No. 09/609,453, filed Jun. 30, 2000, now abandoned.

FIELD OF THE INVENTION

This invention relates to a process for coating superabrasive particles with a metal. More specifically it relates to a process for producing diamond abrasive pieces coated with a thin layer of metal chemically bonded to the underlying abrasive which coated pieces are particularly useful for making metal bonded superabrasive grinding and cutting tools or metalized diamond articles.

BACKGROUND OF THE INVENTION

Diamond superabrasives have utmost hardness which allows them to abrade other extremely hard materials. For example, superabrasive tools are often used to form, dress or sharpen other abrasive tools. Therefore grinding and cutting tools that utilize an abrasive portion containing superabrasive are very important in industry.

In a simplified sense, superabrasive tools basically include pieces of superabrasive materials, a tool quality structural metal core and a metal bond holding the superabrasive in a composite structure or as a single superabrasive layer attached to the core. The pieces can be irregular particles sometimes referred to as grit, grains or granules, or they can be articles of precisely predetermined shape such as diamond film and shaped polycrystalline composites. Shaped diamond inserts are also used for machining hard and abrasive materials such as metal matrix composites and aluminum casting alloys. So-called single layer particle tools are defined by an abrasive layer bonded to the core in which the thickness of the layer is the nominal thickness of only a single abrasive piece.

There are numerous ways to make metal bonded superabrasive tools. Many, such as brazing or soldering, involve placing the granules on the core in contact with a bond composition, heating the assembled ingredients until the bond composition liquefies, then cooling to solidify the bond composition. Ideally, the metal bond composition attaches firmly to the metal of the core and adheres the granules to the core. A major shortcoming of this process is that many preferred metal bond compositions are not strongly adhesive to superabrasives. Weak adhesion provides inadequate bond strength which in turn leads to premature loss of the abrasive particles from the tool during operation. This is particularly problematic for single layer particle tools in which it is preferred to have as little bond mass around the granules as possible to expose a maximum cutting surface. If bond thickness is increased to improve adhesion, the abrasive granules are buried more deeply in the bond and present less cutting surface to the work piece. Moreover, during use the thick bond wears away and leaves an inadequate amount of low strength bond to retain the granules which are easily expelled from the tool.

A well known method of enhancing the adhesion of superabrasive to the metal bond calls for utilizing bond compositions which are reactive with the superabrasive so that during tool fabrication the bond composition adheres to the surface of the abrasive particles. However, many powdered metal bond compositions for superabrasive bonding are categorized as non-reactive because they do not chemically bond with the superabrasive. The lack of chemical bonding to the superabrasive leads to premature release of the superabrasive.

A better adhesion improving technique involves incorporating a reactive metal ingredient in the precursor bond composition. This ingredient is characterized by its ability to react directly with the superabrasive to form a strong chemical bond between a metal moiety and the granule. These so-called "active metal" bond compositions thus have both non-reactive and reactive components. Usually the non-reactive components constitute most of the bond composition. The non-reactive components alloy to form a strong and durable bond which is adhesive to the core. The reactive component tenaciously attaches by chemical bond to the superabrasive and is cohesive with the non-reactive alloy. For example, U.S. Pat. No. 4,968,326 to Wiand discloses a method of making a diamond cutting and abrading tool which comprises mixing a carbide forming substance with a braze alloy and temporary binder, applying the mixture to a tool substrate, applying diamond particles onto the mixture coated tool and heating the thus combined materials to initially form a carbide coating on the diamond. Thereafter the carbide coated diamond is brazed to the tool.

Despite improvement over earlier technology, the active metal technique poses the further problem of assuring that the reactive metal ingredient is present at the surface of the superabrasive granules where it is desired to form the chemical bond. In a basic aspect of the technique, the reactive metal ingredient is mixed in particulate form with other components of the metal bond composition. The mixture is then applied either as a paste or dry. Only that portion of the reactive metal ingredient in proximity to the superabrasive bonds directly with the abrasive. Reactive metal ingredient elsewhere in the bond composition is superfluous, or at worst, detrimental to the properties of the overall bond. Therefore, it is important to provide the reactive metal ingredient in as fine a particle size as possible and to blend the reactive metal ingredient into the mixture uniformly to obtain intimate contact between the superabrasive with the ingredient during bond formation.

One proposed approach to solving this problem is to coat the superabrasive granules with the reactive metal ingredient prior to mixing with the other bond components. The reactive metal ingredient would thus be optimally placed at the appropriate time for bond formation. For example, U.S. Pat. No. 5,855,314 to Shiue et al. teaches a coating method in which reactive metal ingredient particles are mechanically bound to the surface of the superabrasive grains. This is accomplished by mixing reactive metal ingredient powder with a liquid binder to form an adhesive paste, mixing the paste with the abrasive grains to wet the grains, and drying the mixture to adhere active component to the grains. Still it is important to reduce as much as possible the particle size of the reactive metal ingredient particles to achieve uniform coverage of the grains. Even if supplied as a fine powder, the reactive metal ingredient is present at the surface in a macromolecular amount and therefore usually in excess of the amount needed to cement the bond to the superabrasive. Because the reactive metal ingredient and superabrasive often are irregularly shaped particles, it is difficult to assure that the coating will either be complete or uniform over the superabrasive surface.

Other methods are known for applying very thin layers of a metal onto an substrate. These include physical vapor deposition (PVD) and chemical vapor deposition (CVD). The former involves infusing electrical or thermal energy to atomize a metal target and allowing the resulting hot metal atoms to condense on the cooler substrate. This procedure does not form a chemical bond between the deposited metal and the substrate. CVD processes introduce a metal compound in a gaseous form into a heated CVD chamber containing the substrate to be coated. The heat causes the gaseous metal compound (e.g., tungsten hexafluoride) to dissociate to metal atoms which coat the substrate while a usually gaseous byproduct of dissociation is removed.

Sometimes rather than merely mechanically coating the substrate with metal, CVD can provide a metal-to-substrate chemical bond. This is a very attractive attribute because it permits the abrasive tool manufacturer to adhere this pre-bonded metal coated superabrasive material to a tool core utilizing a simple flux and brazing or induction furnace process in air. If the metal coating is not chemically bound to the superabrasive beforehand, the tool must be fabricated in a much more complicated and expensive process, such as by brazing in a controlled atmosphere of inert gas or vacuum.

Unfortunately, CVD results in metal-to-substrate bond formation only in some metal/superabrasive systems and only upon application of extreme heat. Also, the gaseous byproduct can be detrimental to the substrate. This phenomenon is addressed by Chen et al. in U.S. Pat. No. 5,224,969 which relates to a method of coating chromium covered diamond particles with tungsten by CVD. The patent explains that CVD utilizing tungsten hexafluoride liberates fluorine containing gas which reacts detrimentally with the chromium. Accordingly, Chen et al. teaches an operative but complex three layer coating process in which CVD is employed to apply the third layer. Furthermore, the gaseous reagents and byproducts associated with CVD coating processes are strongly toxic to humans.

It would be highly desirable to produce superabrasive material having ultra thin coatings of reactive or even non-reactive metal without the difficulties or complications associated with the aforementioned methods. Additionally it is desirable to easily produce a coating of a reactive metal directly on the surface of the superabrasive without the need for intervening barrier metal layers. Also there is a need for an expeditious procedure to make a chemically bonded metal coating on superabrasive material. This would provide for example, a source of metal coated superabrasive suitable for making long lasting and effective abrasive tools or cutting tool inserts that could be attached to tool holders using conventional methods, such as flux/brazing or induction furnace heating in air. Such tools would be characterized by a metal bond between the superabrasive and the core of exceptionally superior strength, low bond mass and very high abrasive particle exposure to the work piece. Still further it is desirable to produce reactive metal coatings on superabrasive particles which cover the superabrasive uniformly over its entire surface of the substrate.

SUMMARY OF THE INVENTION

The present invention thus provides a metalized article comprising a structural diamond part coated with a metal by a process comprising the steps of (a) heating to a superambient temperature in an inert atmosphere the diamond and a coat-forming powder comprising an oxide of the metal, (b) maintaining the powder and diamond at the superambient temperature for a duration effective to reduce the oxide, thereby forming a metalized article having a metal layer chemically bonded on at least a portion of the surface of the diamond, and (c) separating the powder from the metalized article.

The novel process utilizes coating precursor in the solid state and does not require heating to extreme temperatures, supplying and handling gaseous metal compounds in a CVD reactor, or infusion of such large amounts of energy per unit mass of product as conventional PVD or CVD. The process makes it possible to uniformly coat metal over the whole of the superabrasive. Advantageously, the coating thickness can be controlled to a molecular scale so that only as much coating metal as desired to enhance bond-to-superabrasive adhesion is present. The metal coated superabrasive product of the novel process is ideal for the manufacture of all types of bonded and coated superabrasive grinding, cutting and machining tools, especially for metal bonded single layer superabrasive tools, and for metal matrix bonded superabrasive cutting, grinding and dressing tools.

DETAILED DESCRIPTION

The term "particle" is used herein to mean any generic discrete object of solid matter and does not denote a prescribed size or shape. As applied to superabrasive, the term "particle" is intended to denote a piece of superabrasive material of irregular shape or of predetermined shape. Irregularly shaped superabrasive is sometimes alternatively referred to as a grain, grit, or granule. Typical examples of structures of predetermined shape include a sphere, cube or other polyhedron, and a sheet or film. By "sheet" or "film" is meant a generally flat geometric object defined by three orthogonal characteristic dimensions, two of which are substantially large in relation to the third. The term "powder" is used herein to mean a discrete piece of solid coat-forming material regardless of size and shape. In reference to the coat-forming material, "powder" may mean either a single discrete solid piece or a plurality of such pieces. Unless otherwise indicated to the contrary, the size and shape of a superabrasive particle can be the same or different from a powder of coat-forming metal compound.

In a basic aspect the present invention primarily relates to forming an elemental metal coating on a superabrasive particle. The metal to be coated onto the superabrasive particle is supplied as a constituent of a chemical compound which is in a powder form. The coating is carried out using a fundamental inorganic chemistry reduction reaction conducted at elevated temperature in an inert atmosphere. The superabrasive serves as a reducing agent to react with the elemental metal from the metal compound which then forms a chemically bonded coating on the surface of the superabrasive particle.

The process advantageously exploits a chemical reaction between the coated metal and the superabrasive to form a strong chemical bond at the boundary between the metal and the superabrasive. With exposure to high temperature, the novel process produces a structure comprising a superabrasive substrate and a layer of metal affixed to the substrate by the chemical bond which forms an interlayer between the superabrasive substrate and outer metal layers. This creates tenacious adhesion between metal and superabrasive that is stronger than normally obtained mechanical coatings.

It is a characteristic of the novel process that the source of coat-forming metal is a powdered metal compound capable of being thermochemically reduced to elemental metal by a reducing agent. Moreover, the superabrasive itself is preferably the sole reducing agent present to accomplish the thermochemical reduction. That is, the reduction step of the process can be conducted in an environment substantially free of other reducing agents. By "substantially free" it is meant that other reducing agents are absent in such an amount that appreciably interferes with the coating of the superabrasive but is not construed to mean absolute absence of all other reducing agents. It follows that a small portion of the surface of the superabrasive particle is consumed in the step of reducing the metal compound. Fortuitously, to obtain metal coated superabrasive grains suitable for strong metal bonding to an abrasive tool, a very thin layer of metal on the superabrasive is sufficient and only a negligible amount of superabrasive should be consumed for reducing agent purposes.

Synthetic, natural and CVD diamond and polycrystalline diamond (PCD) and mixtures thereof, are suitable for use in the novel process. Superabrasive grain sizes customarily used in abrasive tools work well in the novel process. Such particles are typically irregularly shaped and preferably have a characteristic dimension in the range of about 0.1 micrometer–5 mm. A much narrower particle size range can be employed in any given abrasive tool application. Particle sizes of typical commercial superabrasive grains usually range from about 0.0018 inch (0.045 mm) to about 0.046 inch (1.17 mm). Certain superabrasive grain of particle size sometimes called "microabrasive" can range from about 0.1 micrometer to about 60 micrometers. Abrasive grain size is usually determined by filtering the grains through sieves having precisely sized holes. The term "characteristic dimension" thus refers to the nominal hole size of a sieve through which particles do or do not pass.

The novel process is also well suited to metal coating superabrasive objects larger than about 5 mm. These objects can be irregularly shaped, granular, large crystals, or articles of predetermined shape, such as thin sheets or more intricate structurally shaped objects such as cones, rods, bars, disks and the like. Thin superabrasive sheets include rectangular diamond sheets having length and width preferably about 5–250 mm and thickness preferably about 0.2–2 mm, and more preferably, about 0.5–1 mm. Such sheets can be made by CVD and are often referred to as "diamond film". The novel process is readily adapted to coat large pieces of superabrasive by depositing the superabrasive on or in a bed of the metal compound coat-forming powder.

Normally, the entire surface, including both sides of a sheet-form abrasive particle will be coated. Optionally, the large particles can be masked to achieve predetermined surface coating patterns. The optional mask technique prevents the metal from coating a portion of the surface. Thus for example, masking can accomplish selective coating of one side only, edges only, all but edges and parts of each side of sheet-form superabrasive particles.

A superabrasive particle can be masked by applying a layer of barrier material to the surface prior to beginning the thermal treatment steps of the process. During coating or after coating is completed, the mask can be removed to produce a superabrasive particle which is coated with metal on the portion of its surface that was not masked and is uncoated on the surface portion that was masked. Suitable barrier materials include refractory oxides, nitrides, carbides, i.e., compounds that are more stable than the metal-containing compound. Examples of barrier materials include alumina, yttria, zirconium and titanium carbide.

The metal compound should be a chemical compound of a preselected coat-forming metal which can be thermo-chemically reduced by the superabrasive to produce the metal in elemental form. Preferably the metal is chosen first to achieve a desired objective for a particular coating application. For example, in the fabrication of metal bonded abrasive tools, among other things it is particularly desired to provide a coat-forming metal which is compatible with the metal bond composition and reactive with the superabrasive. Metal bond compositions for abrasive tools are well known in the art. Representative metal components in typical metal bond compositions are tin, copper, silver, nickel, zinc, aluminum, iron, cobalt and mixtures thereof. Tungsten is a particularly preferred coat-forming metal. Preferably the metal compound is an oxide of the preselected coat-forming metal and tungsten oxide is much preferred.

The amount of raw materials present should be sufficient to provide the desired thickness of metal coating on the superabrasive. That is the aggregate amount of metal should be greater than the stoichiometric quantity necessary to generate the desired thickness of metal coating. Superabrasive particles for use in metal bonded, single layer abrasive tools ought to be sufficiently coated when the metal layer is at least about two molecules thick. Normally it is impractical to measure such small dimensions. For purposes of defining this invention an average metal coating thickness of at least about 100 nm is deemed adequate. In general, the total weight of coat-forming powder will depend upon surface area of the superabrasive to be coated. Smaller abrasive particles can require more coat-forming powder per unit weight than larger abrasive particles because smaller particles have larger surface area to mass values.

In a preferred embodiment of this invention diamond can be coated with tungsten by heating diamond and coat-forming powder of tungsten oxide together in an inert atmosphere. Tungsten oxide is provided as a bright yellow powder and diamond is present in granular or shaped particle form. Provided that the coat-forming powder and superabrasive particles are within a common, oxygen-free atmosphere, and preferably within close proximity to each other, a chemically bound coating will form although the superabrasive and coat-forming powder are not in mutual physical contact.

Without wishing to be bound by a particular theory, it is believed that a tungsten carbide bonded coating of tungsten on the diamond is formed in accordance with chemical reactions [I] and [II] as follows:

$$WO_3 + 3C \rightarrow W + 3CO \qquad [I]$$

$$W + C \rightarrow WC \qquad [II]$$

The unexpected phenomenon of coating without the raw material solids touching each other can occur because a portion of the tungsten oxide vaporizes and chemically dissociates to form a tungsten coating at an acceptable rate. The tungsten is carborized to form tungsten carbide at the surface of the diamond. The reduction reaction also forms carbon monoxide gas which is purged from the atmosphere, as will be explained, below.

| Metal Oxide Compound | Approximate Initial Reaction Temperature ° C. |
|---|---|
| $VO_2$ | 900 |
| $V_2O_4$ | 900 |
| $V_2O_5$ | 700 |
| $V_3O_5$ | 1000 |
| $V_4O_7$ | 900 |
| $MoO_7$ | 700 |

| Metal Oxide Compound | Approximate Initial Reaction Temperature ° C. |
|---|---|
| MoO$_3$ | 600 |
| Ta$_2$O$_5$ | 1100 |

When heated in the presence of these powders, a coating is formed on the surface of the diamond particle by the following reaction:

MeO+C(diamond)=MeC+CO(gas)

wherein Me is a metal, MeO is a metal oxide and MeC is a metal carbide.

The temperature of the process will depend upon the initial reaction temperature for the selected metal oxide. As set forth in the table above, reaction temperatures needed to vaporize and chemically disassociate these metal oxides may range from about 600 to about 1100° C. Preferred metal oxides are the oxides of tungsten (W) vanadium (V), tantalum (Ta) and molybdenum (Mo), and combinations thereof. In contrast to these metal oxides, titanium oxide (TiO$_2$) will form a metal coating of TiC on the superabrasive particle, but the superabrasive can undergo undesirable thermal degradation at the TiO$_2$ dissociation temperature of about 1300° C. In the case of Ta$_2$O$_5$, having a dissociation temperature of about 1100° C., natural diamond particles may be used as a substrate without undergoing thermal damage, but synthetic diamond particles will undergo undesirable thermal degradation. Thus, a metal oxide having a maximum vaporization or dissociation temperature of 1100° C. is preferred for use as the reagent in the carbo-thermal reduction process for coating superabrasive particles. When tungsten oxide is used, a temperature of about 1050° C. is preferred for either synthetic or natural diamond. It has been observed that a coating formed at such a high temperature causes a decrease in diamond friability, relative to unheated, uncoated diamond.

As the thermal process continues, a layer of metal coating builds up on the diamond, first as metal carbide and then as metal. The metal will coat the exposed surfaces of the diamond at a rate depending upon the crystallographic orientation of the diamond surface. Advantageously, the process tends to produce a relatively uniform thickness coating on the superabrasive surface. Generally, the longer the exposure, the thicker the metal layer that is formed. Deposition of metal is stopped when a desired coating thickness has been achieved by segregating the coat-forming powder from the superabrasive, or by removing the coat-forming powder from the common inert atmosphere. Other methods of stopping coating development are to lower the temperature of the mixed particles and/or to sweep the inert gas over the reacting particles at a high flow rate effective to purge the atmosphere of reactive tungsten.

The inert atmosphere provides the vehicle for transporting the chemical vapor species involved in carrying out the reduction and deposition processes. Therefore, it is important that the coat-forming powder and the superabrasive to be coated are both within the same inert atmosphere. The inert atmosphere can be static, however, some motion can mobilize species toward the solid materials and tends to improve coating rate. Therefore, it is preferable to sweep the inert atmosphere across the bed of solid raw materials. Flow can be stopped during the process. Excessive flow can dilute and carry away vapor state reactants before they arrive at the superabrasive surface. Concentration of the reduction reaction byproduct, e.g. carbon monoxide, can build up in a static or even recirculating atmosphere. This can slow the metal coating process. Hence it is desirable to purge the atmosphere of byproducts during the course of the process. This can be accomplished by venting a portion of the atmosphere and replenishing with fresh inert gas to make up for the vented volume. Preferably, the volume of the inert gas atmosphere should be replaced about 5–20 times per hour.

By the term "inert" is meant that the composition of the inert atmosphere is substantially free of oxygen or other substances that would interfere with the reduction reaction. Absence of oxygen can be achieved by sweeping inert gas or drawing vacuum over the superabrasive and coat-forming powder. The vacuum should be imposed at a pressure effective to assure evacuation of substantially all oxygen in the atmosphere. Preferably the vacuum should produce an atmosphere of absolute pressure less than about 3 Pa.

Preference is given to generating the inert atmosphere by displacing oxygen-containing atmosphere with an oxygen-free inert gas in an ambient or higher pressure atmosphere. The inert gas can be swept over the solid reactants at rates effective to mobilize the vapor state reactants and thereby promote efficient coating of the superabrasive. Representative inert gases suitable for use in this invention are argon, helium, krypton, neon, nitrogen, xenon and mixtures thereof. Argon and nitrogen are preferred.

As mentioned, the coat-forming powder and superabrasive particle need not be in mutual physical contact to carry out the novel process. The particle and powder can be segregated from each other. For example, coat-forming powder can be placed in a crucible and the superabrasive particles can be placed on a screen suspended over the crucible within the same inert atmosphere. Preferably the coating is carried out batchwise by subjecting the solid batches of coat-forming powder and superabrasive in the crucibles to heat treatment. A continuous process is contemplated to come within the breadth of the present invention. For example, coat-forming powder and superabrasive particles can be continuously laid down in adjacent but separate bands parallel to the machine direction of a continuously moving belt conveyor. The belt can move through an oven under inert atmosphere. These segregated particle process embodiments feature the ability to easily separate coated superabrasive product particles from the coat-forming raw material particles at conclusion of the process. This is desirable when the coat-forming and superabrasive particles are approximately of the same size. It also allows collecting differently sized product particles which might be damaged by mechanical operations such as sieving.

The novel process can be carried out with a mixture of coat-forming powder and superabrasive particles. In a batchwise process the mixture is placed in a single crucible then heat treated as a batch.

Preferably the mixture is prepared by dry mixing the coat-forming powder with the superabrasive material. The mixture can be prepared batchwise or continuously. Conventional blending equipment such as ribbon mixers, drum tumblers, and V-cone mixers can be used. Low energy blending equipment is preferred to avoid comminuting the superabrasive particles. In another preferred embodiment the coat-forming powder is of a size in a range different from the superabrasive particle size range. The particle size of the coat-forming powder typically is smaller than the superabrasive particles. Thus the superabrasive particles can readily be separated from the coat-forming powder by simply sifting a mixture through appropriately sized sieves. The procedure for separating product particles from a mixture preferably should not utilize the elutriation method. This procedure tends to abrade the particles against each other and against the elutriator impact plate which can alter particle size and/or damage the metal coated superabrasive product. Superabrasive particles may be separated from the powder by adding the mixture to a liquid, such as water. The lower density powder will float and the higher density superabrasive will sink.

In another preferred aspect, the coat-forming powder and superabrasive should be arranged to present a large surface area exposed to the inert atmosphere. This can be accomplished by arranging the solid materials in shallow, quiescent beds. Preferably the bed depth should be at most about 20 times the average size of the particles in the bed. For granular or other irregularly shaped particles, the dimensions to be used for determining the average size of the particles should be the nominal mesh opening size of the largest/smallest sized screens which respectively allow none/all of the particles to pass. If the coat-forming powder is in a mixture with the superabrasive particles, the preferred bed depth should be at most 20 times the average particle size of the superabrasive. If the superabrasive is in the form of sheet, the dimension to be used for determining the bed depth is the thickness of the sheet. Hence, it is preferable to arrange the coat-forming powder in a bed of at most about 20 mm deep for coating diamond film of about 1 mm thickness.

The containers in which the coat-forming powder and superabrasive particles are held during heat treatment should be of composition adapted to withstand high temperatures and to not interfere with the coating process. Preferably ceramic crucibles can be used. Any refractory ceramic other than a graphite ceramic, e.g., clay-graphite, is suitable for use.

The primary parameters for controlling the novel process are temperature and time. After the coat-forming powder and superabrasive are assembled together in the inert atmosphere, the temperature is elevated to start the reduction reaction. Generally, the threshold superambient temperature for reaction to commence depends upon the properties of the superabrasive and metal compound. It is usually at least about 500° C. Normally, the process proceeds faster at higher temperatures, however, the temperature of superabrasive degradation should not be exceeded. This is the temperature at which the superabrasive changes form to lose its superabrasive properties, i.e., ultra hardness. Exposing diamond to temperature above about 1200° C. at or below atmospheric pressure of an inert gas atmosphere causes the diamond to rapidly convert to graphite. The preferred range is about 700–1100° C. for optimum reaction kinetics and minimum thermal damage. The more preferred range is about 700–1075° C., most preferably 800–1050° C.

Elapsed time to achieve complete metal coating depends upon such factors as the size and type of the superabrasive pieces, inert gas flow rate, heating rate, and reaction temperature. To produce desired results thermal processing exposure time at temperatures above about 500° C. according to the present invention will require at least about 30 minutes, preferably at least about 1 hour and most preferably 2–4 hours. Longer thermal exposure times may be used. Generally, at the preferred temperatures under an inert gas, a coating thickness of about 0.1 micrometer can be achieved for each hour of thermal treatment of diamond abrasive particles of about 300–800 micrometers in size. Guided by the present description, one of ordinary skill in the art should be able to identify the appropriate combination of process conditions to achieve satisfactory results without undue experimentation.

In a typical implementation of the novel process, the desired superabrasive to be coated, coating metal and coat-forming compound are selected. The surface of the superabrasive pieces to be coated should be free of metallic contamination. Conventional methods of removing such contamination can be utilized. The superabrasive and coat-forming compound particles are brought together in close proximity under an inert atmosphere, preferably an inert gas atmosphere. Preferably the particles are mechanically blended together to form a mixture. Thereafter, the temperature is raised. It is held at an elevated value below the temperature of degradation of the superabrasive for a period effective to produce a coating on the superabrasive particles. While coating proceeds, the inert gas can be wafted across the bed of raw material and product at a flow rate effective to support the rate of metal coating. When sufficient bond formation has occurred, the process is stopped and the superabrasive particles are cooled. Coated superabrasive is separated from excess coat-forming powder. This provides a product in which an outer metal layer is chemically bound to superabrasive.

Rate of cooling of the coated superabrasive particles to ambient temperature is not critical. Although it is recommended not to damage the product by thermally shock cooling the product, cooling from reaction temperature to ambient temperature can take place in less than one hour, preferably in less than about 30 minutes. The inert gas atmosphere can be removed, that is, an oxygen-containing gas can be introduced, when the temperature of the particle bed descends below about 150° C. The excess coat-forming powder are then separated from the metal coated superabrasive particles and can be recovered, classified as to size and used again in subsequent coating procedures according to the invention. The coated superabrasive can be subsequently cleaned by exposing the outside metal surfaces to flowing hydrogen at temperature of about 600–800° C. for at least about 30 minutes. Finally, the product is analyzed, inspected and packaged for storage or transport.

It has been discovered that replacing the inert gas with hydrogen for at least about 30 minutes while the particle bed temperature is descending during the cool down step can eliminate a subsequent, separate oxidation removing, cleanup step. Preferably the product is exposed to flowing hydrogen while the temperature is kept within the range of about 700–800° C. This hydrogen exposure during cool down not only cleans the metal surface of the coated particles but also reduces some of the excess coat-forming powder to elemental metal or lower oxides and thereby makes them more easily separated from the product. Incomplete cleaning can result if too much metal compound is present. If in situ cleaning process is incomplete, the metal coated product will appear discolored. For example, oxidized tungsten on coated diamond may have a brown color. In such case, a conventional follow-up hydrogen cleaning step can be utilized. That is, the product isolated from coat-forming powder can be reheated in hydrogen.

Metal coated superabrasive particles produced in accordance with the novel process can be incorporated in the abrasive portion of metal bonded, metal core abrasive tools by various techniques well known in the art. For example, the particles can be combined with particulate components of a metal bond composition, compacted under pressure ("cold pressing") to form a shaped abrasive portion, then sintered. The particles are also suitable for "hot pressing"

involving simultaneous application of heat and pressure to form the abrasive portion. The may be utilized in a so-called infiltration tool fabrication process in which the coated superabrasive particles are packed in a mold cavity within a powdered matrix of metal bond components prior to filling the interstices with a molten, low melting infiltrant metal or alloy. Additionally, the coated superabrasives are suitable for attachment to abrasive tools (e.g., in a single layer of abrasive grain on the surface of a metal tool body or core) by electroplating or brazing, or possibly with soldering.

Use of the coated superabrasive advantageously improves diamond/metal bond adhesion and abrasive and tool life of cutting wheels, diamond saw blades and drill bits, single layer abrasive metal bonded tools, grinding wheels, machining tools, dressing tools, and coated abrasive tools and belts. Further, the coated superabrasive has improved oxidation resistance allowing manufacture of certain abrasive tool components in the presence of oxygen, without the need for an inert atmosphere.

A particular benefit of the coated superabrasives of the invention has been observed in brazing abrasive elements to a tool core or body. In the past, some tools had to be constructed by brazing the abrasive or cutting element to the metal of the tool core or substrate (e.g., a shank cylinder, wheel core or disk) under an non-oxidizing atmosphere to avoid thermal damage to the superabrasives. The use of a non-oxidizing atmosphere is costly and raises the complexity of the manufacturing process. By providing a metal coating on the superabrasive surface, the brazing operations may be carried out under atmospheric conditions and higher temperature brazes may be used. Higher temperature brazes can yield a more durable bond between the tool body and the abrasive or cutting element, so further benefits may be realized in the longer life of the tool.

EXAMPLES

This invention is now illustrated by examples of certain representative embodiments thereof, wherein all parts, proportions and percentages are by weight unless otherwise indicated. All units of weight and measure not originally obtained in SI units have been converted to SI units. Granular particle size measurements use an "x/y mesh" nomenclature convention in which x and y are U.S. Sieve Series sieve designation numbers, x corresponding to the smallest mesh opening through which all of the particles pass and y corresponding to the largest mesh opening through which none of the particles pass. That is, 40/50 mesh diamonds filter through 420 micrometer opening mesh and are retained by 297 micrometer opening mesh.

Example 1

Fifty grams of 40/50 mesh DeBeers grade SDA 100+ synthetic diamonds were placed in a ceramic crucible with 75 g of 400/mesh (i.e., particles pass 37 micrometer screen opening) tungsten oxide ($WO_3$) particles. The diamonds and tungsten oxide were manually stirred using a spatula to provide a free-flowing, uniform mixture. The crucible was placed in a Lindberg retort furnace which was continuously swept to exhaust with nitrogen at 142 L/h (5 cubic feet per hour "CFH"). Furnace temperature was raised to 1050° C. at approximately 10° C. per minute. On reaching 250° C. argon was swept through the retort in place of and at the same rate as the nitrogen. The diamond/tungsten oxide mixture was held in the argon atmosphere at 1050° C. for 30 minutes. Then the heating jacket was pulled away from the retort which cooled the furnace to 750° C. in about 10 minutes. At this temperature hydrogen was swept through the retort in place of and at the same rate as the argon. The heating jacket was replaced near the retort and the controls were set to maintain furnace temperature at 750° C. under argon for 30 minutes. Thereafter the heating jacket was again withdrawn from the retort which cooled the furnace to room temperature over about 20 minutes. Hydrogen flow to the retort was stopped when temperature dropped to 100° C. The diamonds were recovered by pouring the mixture through a 100 mesh screen. Visual inspection revealed that the diamonds had a matte gray surface color. Diamonds previously coated with tungsten as had been confirmed by x-ray diffraction analysis exhibited similar coloration. Therefore, it was concluded that the diamonds of this example were satisfactorily coated with tungsten metal. Also x-ray diffraction had shown the presence of tungsten carbide in the metal layer and Auger analysis confirmed the presence of carbon and tungsten in the coating.

Example 2

The procedure of Example 1 was repeated except that 7.68 g of 30/40 mesh DeBeers grade SDB1125 synthetic diamonds were mixed with 11.52 g of tungsten oxide. After separating the diamonds from the tungsten oxide, visual inspection revealed that the surface of the coated diamonds had a mottled brown/gray coloring. This surface characteristic is typical of tungsten coated diamond in which the tungsten is oxidized.

The oxidized tungsten coated diamonds were deposited into a clean crucible which was then replaced in the furnace. The furnace was swept with nitrogen as before and the temperature was raised to 750° C. Upon reaching 250° C. the nitrogen was replaced by hydrogen sweep at the same rate. The coated diamonds were held in the hydrogen for 30 minutes at 750° C. Thereafter the heating jacket was moved away from the retort which cooled the furnace to room temperature and the hydrogen flow stopped. Visual inspection showed that the surface color of the coated diamonds was matte gray and indicated that the tungsten coating on the diamonds was satisfactory. The coated diamonds weighed 7.92 g after coating demonstrating a total weight gain of 0.24 g.

Example 3

The procedure of Example 1 was repeated except that 1.03 g of natural diamonds were coated using 1.54 g of tungsten oxide. The operating conditions were also the same except that the furnace was heated up to and held at 1000° C. for 4 hours to achieve coating. Also the hydrogen flow was stopped when the furnace had cooled to room temperature. After separation from tungsten oxide particles, the coated diamonds had a matte gray surface coloring and a total weight of 1.0414 g. Hence, the diamonds gained a total of 0.3737 g tungsten metal coating. Auger depth profile analyses of diamonds coated previously by similar methods suggest that the tungsten coating thickness was approximately 0.4 micrometers.

Example 4

The procedure of Example 2 was repeated except that 40.0117 g of 30/40 mesh natural diamonds were coated using 60.0176 g of tungsten oxide. After the second hydrogen heat treatment, the diamonds had a matte gray surface color indicating satisfactory coating with tungsten.

Example 5

Two 25.4 mm×25.4 mm square and approximately 0.5 mm thick samples of diamond film (Norton Company, Worcester, Mass.) initially weighed 0.9428 g and 0.895 g, respectively. Each film had one rough textured, matte finished side and a smooth, shiny opposite side. The shiny side of each film sample was painted with Nicrobraz® Green Stop-Off™ Type II paint (Wall Colmonoy Corp., Madison Heights, Mich.). This is believed to be a latex of suspended ceramic powder. The paint was allowed to dry thereby masking the shiny sides of the films. Each film was placed in a ceramic crucible with the painted side facing down onto a bed of 400/mesh tungsten oxide weighing 1.5 times the initial diamond film weight. The rough sides of the film samples were then coated with tungsten according to the procedure of Example 2.

After the second hydrogen heat treatment visual examination revealed that the diamond films had a matte gray color on the rough side indicating satisfactory tungsten coating. On the shiny side of the films the masking material was gone. A slight tungsten coating was evident near the edges but no coating was seen in the central areas. After coating, the film samples weighed 0.9852 g and 0.9061 g, respectively, indicating weight gains of 0.0154 g and 0.0111 g.

Example 6

A bed of tungsten oxide particles were placed in a crucible and a steel screen was positioned above the bed. Natural diamonds were placed on the metal screen so as not to contact any of the tungsten oxide particles. The crucible contents were heated to 1000° C. in argon, held for 4 hours and otherwise treated as in Example 5. At conclusion, product inspection revealed that the diamond surfaces were partially coated with continuous patches of shiny gray metal. Although the metal did not completely coat the diamond, sufficient amount of surface was covered to enable brazing to create strong metal bonding between the partially coated diamond and a metal substrate of a grinding tool.

Example 7

A total of 5.1569 g of 40/50 mesh, DeBeers grade SDB 1125 diamonds and 7.7354 g of −400 mesh tungsten oxide powder were placed into a ceramic crucible. The diamonds and tungsten oxide were mixed with a spatula to obtain a free flowing, uniform mixture. The crucible was placed in a vacuum furnace (Oxy-Gon Industries, Inc., Epsom, N.H. and the temperature controller was set to raise the furnace temperature to 1050° C. The furnace was evacuated with a mechanical vacuum pump to absolute pressure of about 3 Pa (0.03 mbar). The diamond/tungsten oxide mixture was held at 1050° C. for 60 min. under vacuum, after which the furnace temperature controller was set to cool the furnace temperature to room temperature (38° C.). The furnace was equipped with internal shutters which admitted cooling air blown in by automatic cooling fans to lower the temperature at about 10° C. per min. The mixture was poured onto a 100 mesh screen to separate the diamonds from the tungsten oxide.

The diamonds exhibited a purple color representative of heavily oxidized tungsten coating. They were put into a clean crucible which was placed in a Lindberg retort furnace. The furnace was swept with hydrogen gas at 142 L/h and the temperature was raised to 750° C. The diamonds were held at 750° C. in the hydrogen atmosphere for 30 minutes. Then the furnace temperature controller was shut off and the heating jacket was pulled away from the retort. After furnace temperature dropped to 100° C., hydrogen gas flow was stopped. The diamonds had a matte gray surface color which indicated presence of a satisfactory, non-oxidized tungsten coating. Subsequently the metal coated diamonds were found to weigh 5.7206 g corresponding to a weight gain of 0.5637 g.

Example 8

A study was conducted to determine the effects of reaction temperature upon diamond crystal friability and establish whether the coating process of the invention yielded the tough coated abrasive grains needed for tool manufacture.

Diamond abrasive grain (American Boarts Crushing, natural blocky diamond, 25/30 mesh size) was mixed with $WO_3$ powder supplied by Cerac Inc., Milwaukee, Wis. (5 grams diamond and 7.5 grams WO3) and heated at the temperature and times listed below. Except for the variables listed in the table below, the reaction was carried as described in Example 4.

After the coated grain had been separated from the remaining tungsten oxide powder, the friability of the diamond grain was measured by a modification of the FEPA (Federation Eureopeene Des Fabricants De Produits Abrasifs) Standard for Measuring the Relative Strengths of Saw Diamond Grits, Edition 1, May 30, 1994.

Modifications to the FEPA diamond friability test standard consisted of (1) using a Grade 25 52100 steel ball bearing as the test ball; (2) weighing the diamond sample to 0.4000±0.0005 g; (3) substituting some sieve sizes (specifically, Upper Control Sieve size 915 was replaced by 920, and 645 by 650 microns; Lower Control Sieve size 600 by 605, 505 by 509, and 425 by 429; and Breakdown Sieve size 600 by 605, 505 by 509 and 425 by 429); (4) a vibratory sieve was used in place of the sieve shaker; and (5) results were recorded and reported as the number of cycles needed to reach the half-life of the diamond grain (the FEPA standard uses the time needed to break down half of the diamond). Friability results and visual observations of the diamond coating characteristics are listed in the table below.

| Diamond Sample | Coating Temp. ° C. | Coating Time (min.) | Friability Half-Life Cycles | Visual Observations of Coating |
|---|---|---|---|---|
| 1 control | NA | NA | 659 | No coating or heating |
| 2 | 800 | 35 | 678 | intermittent |
| 3 | 800 | 180 | 672 | intermittent |
| 4 | 850 | 180 | 671 | intermittent |
| 5 control | 1050 | 35 | 676 | no coating |
| 6 | 1050 | 35 | 780 | continuous |

These data show an unexpected increase in diamond abrasive grain toughness (i.e., less friability) in grains coated with tungsten at a temperature of 1050° C. (sample 6), relative to grains coated with tungsten at a temperature of 800 to 850° C. (samples 2–4). An improvement also was observed relative to grains without coating (samples 1 and 5). Under the process conditions chosen for this experiment, the coating was continuous when the reaction was carried out at the higher temperature and intermittent when carried out at the lower temperature. These results suggest a benefit from a continuous coating. Because the thermal expansion co-efficient of tungsten is about 49% higher than the thermal co-efficient of diamond, the improved coated diamond toughness may result from a contraction of the continuous tungsten coating during cooling, thereby placing the diamond in compression.

Although specific forms of the invention have been selected for explanation and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A metalized article comprising a structural diamond part coated with a metal by a process comprising the steps of:

(a) heating to a superambient temperature in an inert atmosphere the diamond and a coat-forming powder comprising an oxide of the metal, (b) maintaining the powder and diamond at the superambient temperature for a duration effective to reduce the oxide, thereby forming a metalized article having a metal layer having a carbide of said metal in the layer chemically bonded on at least a portion of the surface of the diamond, an (c) separating the powder from the metalized article.

2. The metalized article of claim 1 wherein the coat-forming powder comprises an oxide selected from the group consisting of oxides of tungsten, vandium, tantalum, and molybdenum and combinations thereof.

* * * * *